May 8, 1956 N. FIENBERG ET AL 2,744,288
MOULDING APPARATUS
Filed July 24, 1950 2 Sheets-Sheet 1
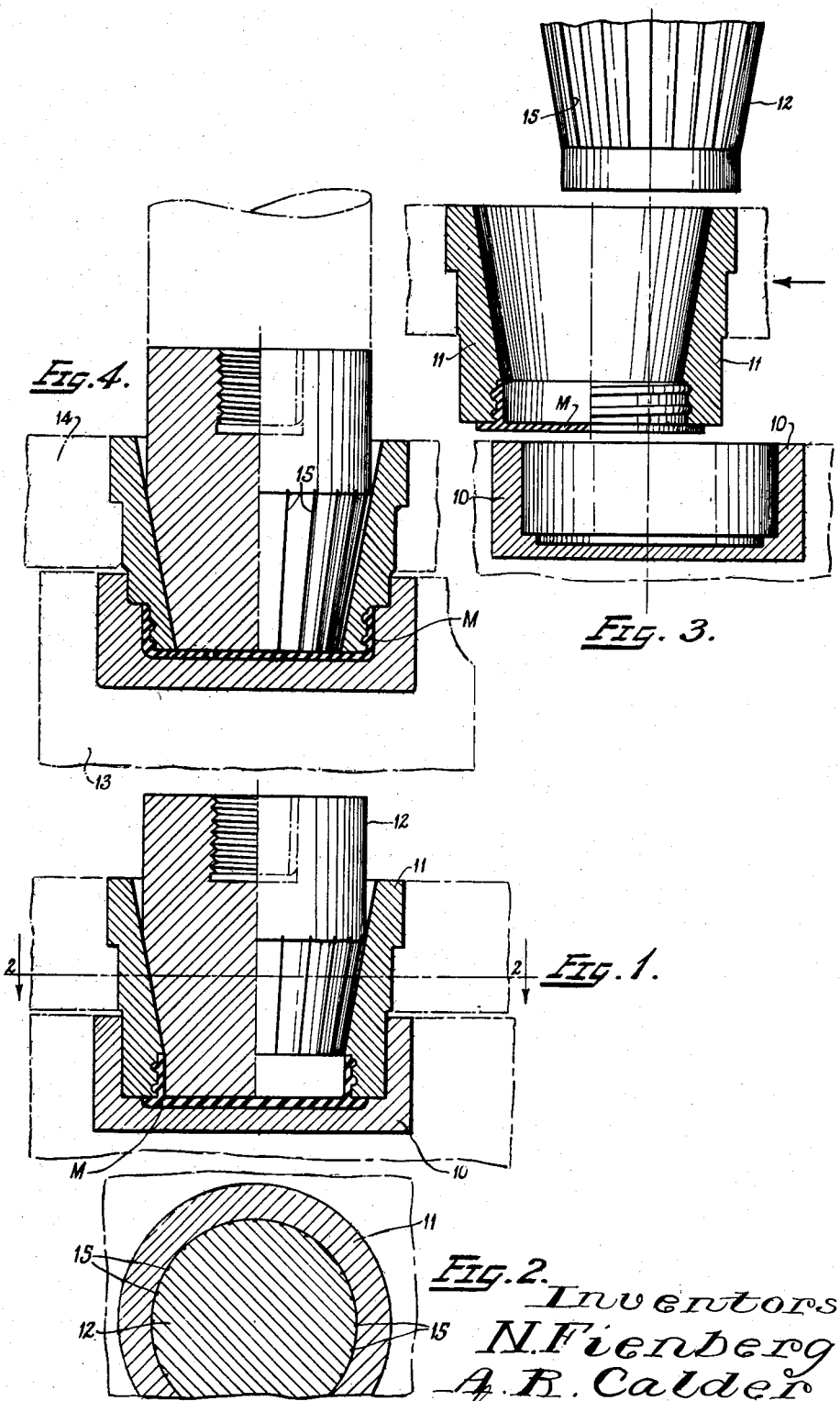
Inventors
N. Fienberg
A. R. Calder May 8, 1956   N. FIENBERG ET AL   2,744,288
MOULDING APPARATUS
Filed July 24, 1950   2 Sheets-Sheet 2
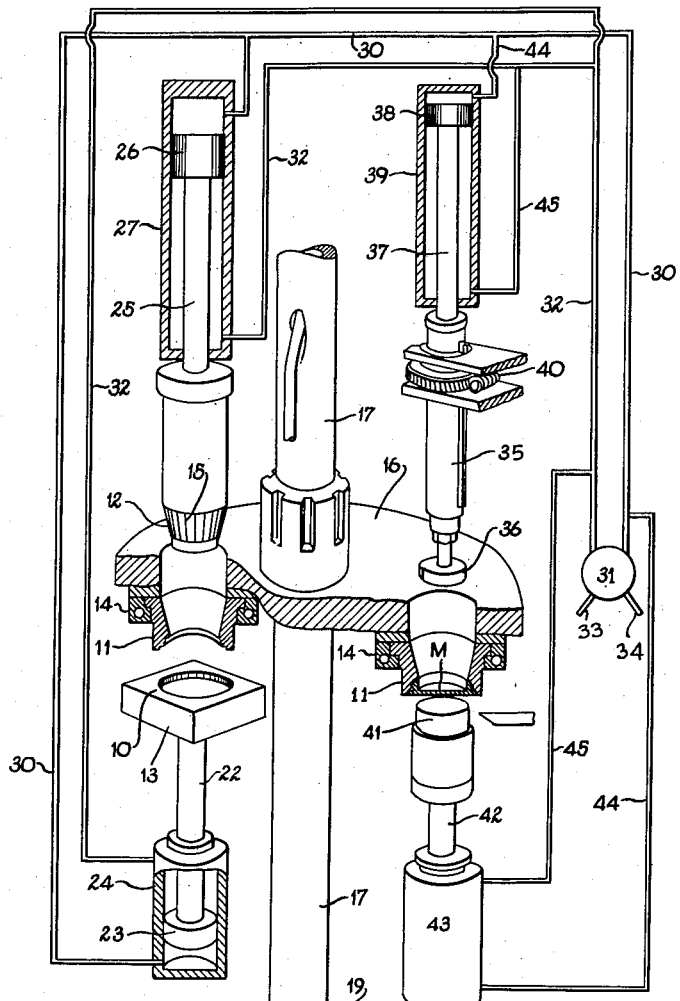
FIG.5.
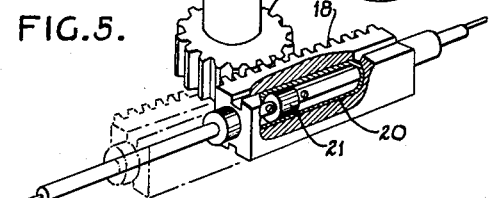
Inventors
N. Fienberg
A. R. Calder
By Stewart Downing Siebold
Attys.

United States Patent Office 2,744,288
Patented May 8, 1956

2,744,288

MOULDING APPARATUS

Nathan Fienberg, Caulfield, Victoria, and Alan Reginald Calder, Newport, Victoria, Australia, assignors to A. C. I. Plastics Proprietary Limited, Melbourne, Victoria, Australia, a company of Victoria Application July 24, 1950, Serial No. 175,633

Claims priority, application Australia July 25, 1949

2 Claims. (Cl. 18—20)

This invention relates to moulds for thermosetting and/or thermoplastic materials and to moulding machines incorporating same and its principal object is to provide an improved mould construction adapted to facilitate venting of air and gases and thereby permit of an increased rate of production and minimise distortion of the moulded articles. Another object is to provide apparatus for actuating the coacting members of the mould.

Accordingly, one broad feature of the invention resides in a mould comprising a ring mould element and an opposed pair of end mould elements adapted to coact with said ring mould and form spaced closures therefor.

Another broad feature of the invention resides in the method of forming from plastic material an article having a relatively thin portion of substantial area comprising subjecting mouldable material to pressure in a mould and then substantially simultaneously venting the mould on opposite sides of said thin portion of the moulded article to obviate substantial deformation thereof by unbalanced gaseous pressure.

The invention also includes apparatus for actuating said coacting mould members, such apparatus comprising means for substantially simultaneously withdrawing said end mould elements from coacting engagement with the ring mould element whereby the pressures on opposite sides of the moulded article are equalised.

One of said end mould elements preferably comprises a plug-like member adapted to enter and engage the inner periphery of the ring mould element and shallow gas discharge grooves are preferably formed by and between the engaging surfaces of said plug and tubular mould element.

The said ring mould element may be shaped to form in the moulded article a screw-thread or other projection by which said article is retained to said ring mould when the mould is opened and the invention includes the provision of means for moving said ring mould, together with the moulded article thereon, laterally out of alignment with the coacting end mould elements after the mould has been opened. For this and other purposes the common axis of the said mould elements is preferably arranged vertically and said ring mould are supported for angular movements about a vertical axis.

Reference is had to our copending application Serial No. 175,632 filed July 24, 1950, now Patent No. 2,675,584, and Patent No. 2,568,956 dated September 25, 1951, and Patent No. 2,621,363 dated December 16, 1952.

For the ensuing more particular description of exemplary forms of the invention, reference will be made to the accompanying drawings, in which:

Figure 1 is a view principally in sectional elevation of a mould constructed in accordance with the invention, such mould being shown in the closed condition, Figure 2 is a view in sectional plan taken on the line 2—2 of Figure 1, Figure 3 is a view similar to Figure 1 and shows the mould in the open condition and with the intermediate member thereof displaced laterally, Figure 4 is a view similar to Figure 1 of a closed mould of modified construction, and Figure 5 is a perspective and somewhat schematic view of means for actuating the mould members.

The mould shown in Figures 1, 2 and 3 comprises a lower member 10, an intermediate ring member 11 and an upper member or plug 12, the mould members 10 and 11 being mounted in suitably heated bolsters 13 and 14 respectively.

The upper and lower members 10 and 12 respectively are disposed permanently in coaxial alignment while as hereafter described the intermediate member or ring mould 11 is preferably so supported that it may be moved laterally out of alignment with the upper and lower members. Thus Figure 3 shows the ring mould 11 partly displaced in the direction of the arrow from its operative position.

The upper member or plug 12 coacts with the intermediate or ring mould 11 to form the male portion of the mould and the lower or female mould member 10 is so shaped as to receive the lower end of the composite male element when the mould is closed as shown in Figure 1. It will be observed that the ring mould operates as a slidable piston in the lower mould member 10 whereby the cavity in the latter is sealed before the mould is fully closed by the abutting engagement of these mould members. Thus the upper and lower members 12 and 10 respectively of the mould are adapted to form spaced closures for the intermediate ring mould.

Accordingly when the mould is closed a moulding cavity of the requisite shape is formed therein, the moulded article M in Figures 1 and 3 being a shallow externally screw-threaded container.

For this purpose the moulding cavity for the cylindrical skirt of the container is formed between the lower end portion of the plug 12 and the adjacent lower screw-threaded portion of the inner peripehry of the ring mould 11.

Accordingly, when the mould is opened as shown in Figure 3 the moulded article M is retained by the screw-thread to the ring mould 11.

In the illustrated embodiment the lower end of the plug 12 is flush with the bottom of the ring mould 11 when the mould is closed and the sides of such plug, which is of circular shape in cross section, diverge upwardly immediately above the top of the mould cavity and the bore of the ring mould is correspondingly tapered so as to form a substantially gas-tight seating for the plug as shown.

The said tapered portion of the plug 12 is formed with a plurality of shallow longitudinally extending grooves 15 through which displaced air and generated gases may escape from the mould cavity, such grooves being so small in cross-section that plastic thermosetting material cannot penetrate far thereinto before it is polymerised. The said grooves 15 thus relieve the pressure of gas within the mould during the moulding operation. When the mould is used for moulding thermoplastic material excessive penetration of the material into the grooves may be prevented by providing a cool zone in the plug.

At the conclusion of the moulding operation, the upper degassing plug 12 and the lower female mould member 10 are simultaneously retracted from the ring mould 11 so that the gases within the mould are simultaneously vented from both sides of the bottom of the moulded article M which is retained to the ring mould by the screw-thread as above mentioned. Thus distortion of the base of the article by an excess of gas pressure on one side thereof is obviated.

In this regard it should be explained that difficulty is commonly experienced when a similar article is formed in the usual two-part mould, particularly when the bottom of the article is flat, as when such a mould is opened the moulded article remains attached to the plug or male member thereof and the gases trapped between it and the article tend to bulge downwardly or outwardly the bottom of the moulded article. In order to limit such distortion, it is usual to cool the mould and delay the opening thereof until the gases and the moulded article are partly cooled but such delay obviously increases the time required to form each article.

The modified mould construction shown in Figure 4 is designed for moulding an article, as for example a jar closure, provided with a screw-thread in the inner periphery of its skirt for which reason the moulding cavity for the latter is formed by and between the outer periphery of the lower end portion of the ring mould and the adjacent portion of the lower mould 10. Thus in this mould the tapered portion of the plug 12 and the corresponding tapered seating in the ring mould 11 extend to the lower ends of such members.

In operation when all three members of the mould are separated a suitable quantity of moulding powder or a preliminary moulding is placed in the cavity in the lower member 10 and the mould is closed in such manner that such members move substantially simultaneously into interfitting engagement, thereby forming the plastic material to the shape of the moulding cavity and subjecting same to heat.

Some of the gases which are generated from the plastic material at this time are able to escape through the shallow grooves 15 (which are shown of somewhat exaggerated area in Figure 2), while some also escape through the joint between the ring mould 11 and the lower member—thereby relieving the internal pressure.

At the conclusion of the moulding operation, all three mould members are separated substantially simultaneously thus tending to obviate distortion of the thin flat base of the moulding by the pressure of gases trapped on one side thereof.

The three elements of the mould may be supported and actuated in any convenient manner, one suitable arrangement being illustrated in Figure 5 wherein a pair of diametrically opposed and alternative ring mould members 11 is supported on a disc 16 secured to a vertical spindle 17 arranged to be turned forwardly and rearwardly through angles of 180° so that the ring moulds 11 are alternately moved to and stopped at the moulding position in alignment with the upper and lower members 12 and 10 respectively.

In the illustrated construction such angular movements are effected by a reciprocable rack 18 which meshes with a pinion 19 on the spindle, the rack being secured to a slidable double-acting hydraulic cylinder 20 within which is arranged a plunger 21 fixed to a suitable support. The movements of the rack in both directions may be arrested by suitable stops whereby the ring moulds 11 are alternately located accurately at the moulding position.

The lower mould member 10 is supported on the upper end of a vertical plunger rod 22 having its lower end secured to a plunger 23 which operates in a double-acting vertically arranged hydraulic cylinder 24.

Similarly the upper member of plug 12 is supported on the lower end of a plunger rod 25 fitted with a plunger 26 which operates in a vertical, double-acting hydraulic cylinder 27.

The outer ends of the cylinders are connected by pipes 30 to one port of a suitable valve 31, arranged to be operated in timed relation with the carrier disc 16, while similarly the inner ends of such cylinders are connected by pipes 32 to a common port of the valve which latter is also connected to oil supply and discharge pipes 33 and 34 respectively.

Thus by operation of the valve the upper and lower mould members are projected and retracted in unison to engage and disengage the intermediate mould member 11 and the latter is arranged to be moved laterally only.

Preferably while one ring mould is positioned at the moulding station the other ring mould is located at a take-out station as also shown in Figure 5, such take-out station being provided with means for removing the moulded articles from the ring moulds.

Such take-out means comprise a vertically disposed upper mandrel 35 provided at its lower end with a headpiece 36, such mandrel being rotatively supported on a plunger rod 37 fitted at its upper end with a plunger 38 which operates in a double-acting hydraulic cylinder 39.

The mandrel is also arranged to be rotated as by worm and worm wheel gearing 40 from a suitable source of power, for which purpose the mandrel is slidable through the worm wheel but is constrained by a key to rotate in unison therewith.

Accordingly, the headpiece 36 may simultaneously be rotated and moved downwards through the disc 16 and ring mould 11 to engage frictionally the upper surface of the moulding and so unscrew same from the ring mould.

Preferably, a rotary support 41 is arranged coaxially below the disc 16 at the take-out station, such support being rotatively mounted on the upper end portion of a plunger rod 42 having its lower end secured to a plunger which operates in a double-acting hydraulic cylinder 43, such cylinder being of smaller diameter than the cylinder 39, so that the rotary support 41 may be pressed downwardly by the headpiece 36 on the upper mandrel 35.

The outer ends of the cylinders 39 and 43 are connected by pipes 44 to the pipes 30, while similarly the inner ends of such cylinders are connected by pipes 45 to the pipes 32, so that the plungers of all four cylinders are projected and retracted in unison.

Accordingly, when each mould member 11 arrives at the take-out station the headpiece 36 is moved downwards with a helical motion, so that it eventually engages the upper surface of the moulding and unscrews same from the mould while the rotary support is moved upwards to engage the lower surface of the moulding, whereby the latter is clamped during the unscrewing operation between the coacting upper and lower members.

When finally the said coacting members are retracted, the moulded article M remains on top of the rotary support 41 and may readily be directed therefrom into a discharge chute or the like.

It will thus be evident that the open-ended tubular formation of the intermediate mould 11 also facilitates the take-out operation.

We claim:

1. Moulding apparatus comprising a vertical, axially reciprocable plug forming one element of a male mould, a reciprocable female mould arranged coaxially below and spaced from said plug, an intermittently movable carrier, a ring mould supported by the carrier, means operable to actuate said carrier whereby the ring mould is periodically moved into the space between and is arrested in coaxial alignment with said plug and said female mould member and means operable when said ring mould is disposed in said aligned position to project said plug and female mould member substantially simultaneously into engagement therewith whereby said plug extends into and seats in the ring mould and coacts therewith to form the male element of the mould and said female mould member engages the adjacent end of the ring mould, said last mentioned means being operable to retract said plug and female mould substantially simultaneously from said ring mould before the next succeeding operation of the ring mould carrier, said ring mould being shaped to form a screw-thread in the moulded article whereby the latter is retained thereto by the screw-thread when the mould is opened and said apparatus including a take-out station for the ring mould, such take-out station being spaced from said coaxially aligned plug and female mould member, a normally spaced coaxially aligned pair of reciprocable take-out members arranged at the take-out station, said ring mould when located at such station being arranged coaxially between the said take-out members, means for projecting said take-out members in unison whereby the moulded article carried by the ring mould is clamped therebetween and means operable subsequently to move said take-out members axially in the same direction and simultaneously to rotate the same, thereby to unscrew the moulded article from the ring mould.

2. Moulding apparatus for the compression moulding of plastic materials comprising a ring mould carrier supported for angular movements about a vertical axis, a plurality of alternative ring-shaped mould members supported on said carrier with their axes disposed vertically, means operable to actuate said mould carrier intermittently whereby said ring-shaped mould members are successively moved to and arrested at a moulding station, a vertically movable plunger member arranged at the moulding station and normally disposed above the level of the upper ends of the ring-shaped mould members, said plunger member being adapted to enter the operative ring-shaped mould member and seat against the inner surface thereof, said plunger member and said ring mould member together forming the male portion of the mould, a vertically movable lower mould member of female form arranged coaxially below said plunger member and normally disposed below the level of the lower ends of the ring-shaped mould members, said lower mould member being formed in its upper surface with a cavity of sufficient capacity to hold the amount of moulding material required to form an article in the mould, said ring-shaped mould member being adapted to operate as a slidable piston in the lower mould member thereby to seal the cavity in the latter before the mould is fully closed and means operable to move said plunger and said lower mould member substantially in unison and in opposite directions whereby after each ring-shaped mould member arrives at the moulding station, said upper and lower members are projected to engage said ring-shaped mould member and are retracted prior to the next operation of the carrier.

References Cited in the file of this patent

UNITED STATES PATENTS

| | | |
|---|---|---|
| 783,516 | Godwin | Feb. 28, 1905 |
| 1,706,874 | De Journo | Mar. 26, 1929 |
| 1,731,240 | Apfelbaum | Oct. 15, 1929 |
| 1,900,012 | Ernst | Mar. 7, 1933 |
| 1,956,532 | Jones | Apr. 24, 1934 |
| 2,031,560 | Day | Feb. 18, 1936 |
| 2,076,389 | Voss | Apr. 6, 1937 |
| 2,306,205 | Crosman | Dec. 22, 1942 |
| 2,317,823 | Strauss | Apr. 27, 1943 |
| 2,452,382 | Long | Oct. 26, 1948 |
| 2,476,831 | Spencer | July 19, 1949 |
| 2,510,841 | Stowe | June 6, 1950 |
| 2,568,956 | Fienberg et al. | Sept. 25, 1951 |